(12) United States Patent
Wiryadinata (10) Patent No.: US 11,179,796 B2
(45) Date of Patent: Nov. 23, 2021

(54) WELDING PARAMETER CONTROL

(71) Applicant: ILLINOIS TOOL WORKS INC., Glenview, IL (US)

(72) Inventor: Indra Budiman Wiryadinata, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 445 days.

(21) Appl. No.: 15/948,382

(22) Filed: Apr. 9, 2018

(65) Prior Publication Data
US 2018/0236587 A1 Aug. 23, 2018

Related U.S. Application Data (63) Continuation of application No. 13/178,168, filed on Jul. 7, 2011, now Pat. No. 9,993,891.
(Continued)

(51) Int. Cl.
*B23K 9/32* (2006.01)
*B23K 9/095* (2006.01)
*B23K 9/10* (2006.01)

(52) U.S. Cl.
CPC ............ *B23K 9/321* (2013.01); *B23K 9/0956* (2013.01); *B23K 9/1087* (2013.01)

(58) Field of Classification Search
CPC ....... B23K 11/24; B23K 11/25; B23K 11/252; B23K 11/253; B23K 9/095; B23K 9/0953; B23K 9/0956
(Continued)

(56) References Cited

U.S. PATENT DOCUMENTS

| 4,021,840 A | 5/1977 | Ellsworth |
| 4,577,796 A | 3/1986 | Powers |

(Continued)

FOREIGN PATENT DOCUMENTS

| CA | 2725719 A1 | 6/2012 |
| CN | 1266391 | 9/2000 |

(Continued)

OTHER PUBLICATIONS

ESAB, "PEK Control panel," pp. 7-8, http://pdfmanuals.esab.com/private/Library/InstructionManuals/0460%20949%20174%20GB.pdf, 2009.
(Continued)

*Primary Examiner* — John J Norton
(74) *Attorney, Agent, or Firm* — McAndrews, Held & Malloy, Ltd.

(57) ABSTRACT

In certain embodiments, a wireless sensor module includes a motion or position sensor configured to detect a defined motion or position of a welding operator. The wireless sensor module also includes memory circuitry configured to store the defined motion or position and an adjustment of an operating parameter of a welding system which corresponds to the defined motion or position. A processor of the wireless sensor module is coupled to the motion or position sensor and the memory circuitry, where the processor is configured to retrieve the adjustment of the operating parameter from the memory circuitry upon detection of the defined motion or position by the motion or position sensor. The wireless senor module further includes a wireless communication device coupled to the processor and configured to transmit the adjustment of the operating parameter to the welding system.

20 Claims, 4 Drawing Sheets

Related U.S. Application Data (60) Provisional application No. 61/364,274, filed on Jul. 14, 2010.

(58) Field of Classification Search
USPC .......... 219/108, 130.21, 136, 137 R, 69.16, 219/86.41, 91.1, 121.28, 121.54, 132
See application file for complete search history.

(56) References Cited

U.S. PATENT DOCUMENTS

| | | | |
|---|---|---|---|
| 4,641,292 | A | 2/1987 | Tunnell |
| 4,733,051 | A | 3/1988 | Nadeau |
| 4,776,323 | A | 10/1988 | Spector |
| 4,812,614 | A | 3/1989 | Wang |
| 5,572,102 | A | 11/1996 | Goodfellow |
| 5,923,555 | A | 7/1999 | Bailey |
| 5,932,123 | A | 8/1999 | Marhofer |
| 5,978,090 | A | 11/1999 | Burri |
| 6,103,994 | A | 8/2000 | Decoster |
| 6,209,144 | B1 | 4/2001 | Carter |
| 6,242,711 | B1 | 6/2001 | Cooper |
| 6,271,500 | B1 | 8/2001 | Hirayama |
| 6,337,458 | B1 | 1/2002 | Lepeltier |
| 6,388,422 | B1 | 5/2002 | Lew |
| 6,476,581 | B2 | 11/2002 | Lew |
| 6,516,289 | B2 | 2/2003 | David |
| 6,624,388 | B1 | 9/2003 | Blankenship et al. |
| 6,842,722 | B2 | 1/2005 | David |
| 7,178,932 | B1 | 2/2007 | Buckman |
| 7,457,724 | B2 | 11/2008 | Vock |
| 7,534,005 | B1 | 5/2009 | Buckman |
| 7,559,902 | B2 | 7/2009 | Ting |
| 7,698,101 | B2 | 4/2010 | Alten |
| 7,808,385 | B2 | 10/2010 | Zheng |
| 7,848,860 | B2 | 12/2010 | Saposnik |
| 7,926,118 | B2 | 4/2011 | Becker |
| 7,962,967 | B2 | 6/2011 | Becker |
| 8,099,258 | B2 | 1/2012 | Alten |
| 8,274,013 | B2 | 9/2012 | Wallace |
| 8,316,462 | B2 | 11/2012 | Becker |
| 8,502,866 | B2 | 8/2013 | Becker |
| 8,569,655 | B2 | 10/2013 | Cole |
| 8,599,323 | B2 | 12/2013 | Chen |
| 8,605,008 | B1 | 12/2013 | Prest |
| 8,680,434 | B2 | 3/2014 | Stoger |
| 8,915,740 | B2 | 12/2014 | Zboray |
| 8,957,835 | B2 | 2/2015 | Hoellwarth |
| 8,992,226 | B1 | 3/2015 | Leach |
| 2002/0180695 | A1 | 12/2002 | Lawrence |
| 2005/0233859 | A1 | 10/2005 | Takai |
| 2007/0102479 | A1 | 5/2007 | Kan |
| 2007/0182709 | A1 | 8/2007 | Brush |
| 2007/0187378 | A1 | 8/2007 | Karakas |
| 2008/0038702 | A1 | 2/2008 | Choquet |
| 2008/0116185 | A1* | 5/2008 | Luck .................. B23K 9/1087 219/132 |
| 2008/0314887 | A1 | 12/2008 | Stoger |
| 2008/0318679 | A1 | 12/2008 | Tran |
| 2009/0057286 | A1 | 3/2009 | Ihara |
| 2009/0276930 | A1 | 11/2009 | Becker |
| 2009/0298024 | A1 | 12/2009 | Batzler |
| 2010/0035688 | A1 | 2/2010 | Picunko |
| 2010/0154255 | A1 | 6/2010 | Robinson |
| 2010/0223706 | A1 | 9/2010 | Becker |
| 2011/0117527 | A1 | 5/2011 | Conrardy |
| 2011/0220619 | A1 | 9/2011 | Mehn |
| 2011/0316516 | A1 | 12/2011 | Schiefermuller |
| 2012/0012561 | A1 | 1/2012 | Wiryadinata |
| 2012/0050688 | A1 | 3/2012 | Wu |
| 2012/0057240 | A1 | 3/2012 | Sundell |
| 2012/0085741 | A1 | 4/2012 | Holverson |
| 2013/0081293 | A1 | 4/2013 | Delin |
| 2013/0112673 | A1 | 5/2013 | Petrilla et al. |
| 2013/0206740 | A1 | 8/2013 | Pfeifer |
| 2013/0206741 | A1 | 8/2013 | Pfeifer |
| 2013/0208569 | A1 | 8/2013 | Pfeifer |
| 2013/0215281 | A1 | 8/2013 | Hobby |
| 2013/0291271 | A1 | 11/2013 | Becker |
| 2014/0059730 | A1 | 3/2014 | Kim |
| 2014/0069900 | A1 | 3/2014 | Becker |
| 2014/0134579 | A1 | 5/2014 | Becker |
| 2014/0134580 | A1 | 5/2014 | Becker |
| 2014/0185282 | A1 | 7/2014 | Hsu |
| 2014/0205976 | A1 | 7/2014 | Peters |
| 2014/0263224 | A1 | 9/2014 | Becker |
| 2014/0272835 | A1 | 9/2014 | Becker |
| 2014/0272836 | A1 | 9/2014 | Becker |
| 2014/0272837 | A1 | 9/2014 | Becker |
| 2014/0272838 | A1 | 9/2014 | Becker |
| 2015/0009316 | A1 | 1/2015 | Baldwin |
| 2015/0072323 | A1 | 3/2015 | Postlethwaite |
| 2015/0125836 | A1 | 5/2015 | Daniel |
| 2015/0154884 | A1 | 6/2015 | Salsich |
| 2015/0248845 | A1 | 9/2015 | Postlethwaite |

FOREIGN PATENT DOCUMENTS

| | | |
|---|---|---|
| CN | 1633345 | 6/2005 |
| CN | 1665634 | 9/2005 |
| CN | 1780712 | 5/2006 |
| CN | 101068648 | 11/2007 |
| CN | 101108439 | 1/2008 |
| CN | 101352778 | 1/2009 |
| CN | 101422839 | 5/2009 |
| CN | 201249320 | 6/2009 |
| CN | 102971106 | 3/2013 |
| EP | 2022592 A1 | 2/2009 |
| EP | 2082656 A1 | 7/2009 |
| JP | 10305366 | 11/1998 |
| KR | 950003258 | 4/1995 |
| WO | 9934950 | 7/1999 |
| WO | 2005084867 | 9/2005 |
| WO | 2006042572 A1 | 4/2006 |
| WO | 2007009131 | 1/2007 |
| WO | 2008101379 A1 | 8/2008 |
| WO | 2009137379 A1 | 11/2009 |

OTHER PUBLICATIONS

Kevin Dixon, et al., 'Gesture-based Programming for Robotic Arc Welding', Carnegie Mellon University, dated Dec. 6, 2002 (24 pages).

International Search Report and Written Opinion for PCT/US2016/013867, dated Apr. 28, 2016 (11 pages).

Li Larry, Time-of-Flight Camera—An Introduction, Technical White Paper, SLOA190B—Jan. 2014, revised May 2014 (10 pages).

Heston, Tim, Lights, camera, lean-recording manufacturing efficiency, The Fabricator, Aug. 2010 (4 pages).

Intelligenter SchweiBbrenner, Intelligent Welding Torch, IP Bewertungs AG (IPB) (12 pages).

Intelligent Robotic Arc Sensing, Lincoln Electric, Oct. 20, 2014, http://www.lincolnelectric.com/en-us/support/process-and-theory/pages/intelligent-robotic-detail.aspx (3 pages).

LiveArc Welding Performance Management System, A reality-based recruiting, screening and training solution, MillerWelds.com 2014 (4 pages).

Handheld Welding Torch with Position Detection technology description, Sep. 21, 2011 (11 pages).

Frank Shaopeng Cheng (2008). Calibration of Robot Reference Frames for Enhanced Robot Positioning Accuracy, Robot Manipulators, Marco Ceccarelli (Ed.), ISBN: 978-953-7619-06-0, InTech, Available from: http://www.intechopen.com/books/robot_manipulators/calibration_of_robot_reference_frames_for_enhanced_r obot_positioning_accuracy (19 pages).

Lutwak, Dr. Robert, Micro-Technology for Positioning, Navigation, and Timing Towards PNT Everywhere and Always Stanford PNT Symposium, Stanford, CA Oct. 29, 2014 (26 pages).

Lutwak, Dr. Robert, DARPA, Microsystems Tech. Office, Micro-Technology for Positioning, Navigation, and Timing Towards PNT Everywhere and Always, Feb. 2014 (4 pages).

(56) References Cited

OTHER PUBLICATIONS

Parnian, Neda et al., Integration of a Multi-Camera Vision System and Strapdown Inertial Naviation System (SDINS) with a Modified Kalman Filter, Sensors 2010,10, 5378-5394; doi: 10.3390/s100605378 (17 pages).
Pipe-Bug, Motorized & Manual Chain Driven Pipe Cutting Machines From Bug-0 Systems (4 pages).
Electronic speckle pattern interferometry Wikipedia, the free encyclopedia (4 pages).
Rivers, et al., Position-Correcting Tools for 2D Digital Fabrication (7 pages).
Wavelength Selective Switching, http://en.wikipedia.org/wiki/wavelength_selective_switching, Mar. 4, 2015 (5 pages).
Cavilux HF, Laser Light for High-Speed Imaging, See What You Have Missed (2 pages).
Cavilux Smart, Laser Light for Monitoring and High Speed Imaging, Welcome to the Invisible World (2 pages).
Windows 10 to Get 'Holographic' Headset and Cortana, BBC News, www.bbc.com/news/technology-30924022, Feb. 26, 2015 (4 pages).
Daqri Smart Helmet, The World's First Wearable Human Machine Interface, Brochure (9 pages).
International Search Report from PCT application No. PCT/US2015/041044, dated Nov. 16, 2015, 15 pgs.
"CyberGlove Data Glove: User Guide," CyberGlove Systems LLC, Dec. 2007, http://www.cyberglovesystems.com/support/; http://static1.squarespace.com/static/559c381ee4b0ff7423b6b6a4/t574f4b392eeb81ec9526760f/1464814396021/CyberGloveUserGuid_wired_rev10.pdf.
"CyberGlove II Wireless Data Glove: User Guide," CyberGlove Systems LLC, Jul. 2008, http://www.cyberglovesystems.com/support/; https://static1.squarespace.com/static/559c381ee4b0ff7123b6b6a4/t/574f4c35b654f98f724d1927/1464814655198/CyberGloveII_UserGuide_2009_0.pdf.
International Search Report for application No. PCT/US2011/043757 dated Nov. 8, 2011.
Canadian Office Action Appln No. 2,831,295 dated Nov. 6, 2017 (4 pages).
Lincoln Electric, "Power Wave Manager user Manual", pp. 26-27, http://lincolnelectric.com/en-za/equipment/Documents/Power-WaveManager.pdf, Jan. 25, 2011.
Canadian Office Action Appln No. 2,831,295 dated Sep. 19, 2018 (5 pages).

\* cited by examiner

WELDING PARAMETER CONTROL

CROSS REFERENCE TO RELATED APPLICATIONS

This application is continuation of U.S. patent application Ser. No. 13/178,168, filed Jul. 7, 2011 entitled "Welding Parameter Control, Via Welder Motion or Position Monitoring," which is a Non-Provisional patent application claiming priority to U.S. Provisional Patent Application No. 61/364,274 entitled "Motion Control Welding Gloves," filed Jul. 14, 2010, which are herein incorporated by reference.

BACKGROUND

The invention relates generally to welding systems, and, more particularly, to a motion detecting system for adjusting a welding parameter.

Welding systems generally include power supplies configured to provide an electric current for use in a welding operation. The power supplies include a user interface allowing an operator to adjust one or more operating parameters of the power supply. For example, the user interface may enable the operator to select or adjust voltage output, current output, welding wire size, welding process, and so forth. For certain welding applications, the power supplies, which may weigh over 80 pounds, are too large or cumbersome to position proximate to the welding operation. For example, the location of a weld may be elevated, confined, restricted, or otherwise difficult to access. In other words, the location of a welding application may be too distant or remote for a welding operator to adjust operating parameters with the user interface of the welding power supply. In such circumstances, the welding operator may have to pause or stop the welding operation and move from the location of the weld to the welding power supply to adjust welding parameters. Unfortunately, this can be very inconvenient and can increase the time it takes to complete a welding task, thereby decreasing overall efficiency.

BRIEF DESCRIPTION

Some examples of the present disclosure are related to a wireless sensor module integrated with an article of clothing. The wireless sensor module comprises a motion sensor or a position sensor configured to detect a defined motion or a defined position of a welding operator, as well as memory circuitry configured to store the defined motion or defined position and an adjustment of an operating parameter of a welding system which corresponds to the defined motion or defined position. The wireless sensor module further comprises a processor coupled to the motion sensor or the position sensor and the memory circuitry, and a wireless communication device coupled to the processor and configured to transmit the adjustment of the operating parameter to the welding system. The processor is configured to retrieve the adjustment of the operating parameter from the memory circuitry upon detection of the defined motion or defined position by the motion sensor or the position sensor. The motion sensor, memory circuitry, processor, and wireless communication device are integrated with a boot or shoe.

Some examples of the present disclosure relate to a method comprising detecting a defined motion, position, or movement with a motion or position sensor of a wireless sensor module, retrieving an operating parameter adjustment associated with the defined motion, position, or movement from memory circuitry of the wireless sensor module, transmitting the operating parameter adjustment from the wireless sensor module to a welding system, and adjusting an operating parameter of the welding system based on the operating parameter adjustment received from the wireless sensor module. The wireless sensor module is integrated with a boot or shoe.

Some examples of the present disclosure relate to a method comprising storing in a memory circuitry of a wireless sensor module a customized motion, position, or movement, and a customized operating parameter adjustment associated with the customized motion, position, or movement. The method further comprises detecting the customized motion, position, or movement with a motion or position sensor of the wireless sensor module, retrieving the customized operating parameter adjustment associated with the customized motion, position, or movement from the memory circuitry of the wireless sensor module, transmitting the customized operating parameter adjustment from the wireless sensor module to a welding system, and adjusting an operating parameter of the welding system based on the customized operating parameter adjustment received from the wireless sensor module. The wireless sensor module is integrated with a boot or shoe.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present disclosure describes exemplary embodiments of a wireless sensor module for controlling an operating parameter of a welding power supply or welding machine. The wireless sensor module is worn by a welding operator and is configured to detect defined motions or positions of the welding operator. More specifically, the wireless sensor module includes one or more motion sensors, position sensors, and/or flex sensors configured to detect or measure particular movements or positions of the welding operator. For example, the wireless sensor module may be integrated with a glove or piece of footwear such as a boot or shoe. Alternatively, the wireless sensor module may be a stand-alone module that is strapped to an appendage, such as an arm or a leg, of the welding operator.

As mentioned above, the sensors of the wireless sensor module are configured to detect particular motions and/or positions of the welding operator. Based on the motions and/or positions of the welding operator, the wireless sensor module sends a wireless signal to a receiver of the welding power supply, indicating the adjustment of one or more operating parameters of the welding power supply. For example, a motion sensor of a wireless sensor module integrated with a glove may be configured to detect a change in the angle of the welding operator's hand. Based on the detected angle change, the wireless sensor module communicates a particular operating parameter adjustment, such as an increase or decrease in current output, to the welding power supply. As discussed in detail below, the sensors of the wireless sensor module may be configured to detect a variety of defined motions or positions, such as a tilt in a hand or foot, or the flexing of a finger. As will be appreciated, each defined motion or position is associated with a desired change, e.g., increase or decrease, of a particular operating parameter of the welding power supply. The specific defined motions or positions associated with each operating parameter adjustment may be customized for different welding operators, and the customizations may be stored in memory circuitry of the wireless sensor module.

Figure 1:
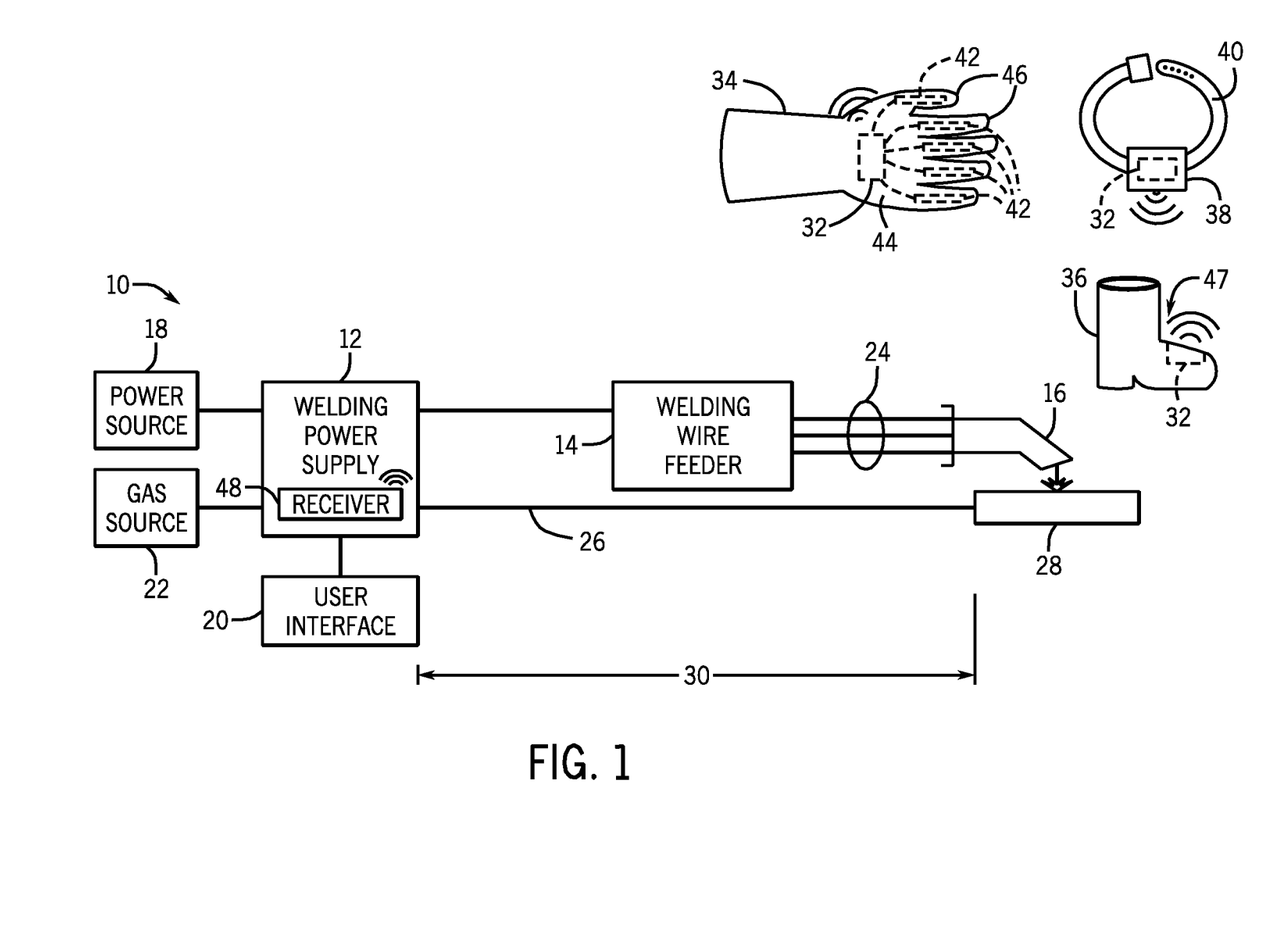
FIG. 1 is a diagrammatical representation of an exemplary welding system.

Turning now to the drawings, FIG. 1 illustrates an exemplary welding system 10 which powers, controls, and provides supplies to a welding operation. The welding system 10 includes a welding power supply 12, a wire feeder 14, and a welding torch 16. The power supply 12 may be a power converter style welding power supply or an inverter welding power supply requiring a power source 18. In other embodiments, the welding power supply 12 may include a generator or alternator driven by an internal combustion engine. The welding power supply 12 also includes a user interface 20 for inputting or adjusting various operating parameters of the welding power supply 12, such as voltage and current. In some embodiments, the user interface 20 may further be configured to input or adjust various operating parameters of the welding wire feeder 14, such as welding wire diameter, wire feed speed, and so forth.

A gas source 22 may also be coupled to the welding power supply 12. The gas source 22 is the source of the gas that is supplied to the welding torch 16. As shown, the welding power supply 12 is coupled to the welding wire feeder 14. More specifically, the welding power supply 12 may be coupled to the welding wire feeder 14 by a feeder power lead, a weld cable, a gas hose, and a control cable. The welding wire feeder 14 in the illustrated embodiment provides welding wire to the welding torch 16 for use in the welding operation. Specifically, the welding wire feeder 14 feeds welding wire from a spool to the welding torch 16. A variety of welding wires may be used. For example, the welding wire may be solid (e.g., carbon steel, aluminum, stainless steel), composite, flux cored, and so forth. Furthermore, the thickness of the welding wire may vary depending on the welding application for which the welding wire is used. For example, the welding wire may be 22 gauge, 20 gauge, 18 gauge, 16 gauge, or other size. The welding wire feeder 14 houses a variety of internal components such as a wire feed drive system, an electric motor assembly, an electric motor, and so forth.

As shown, the welding wire supplied by the welding wire feeder 14 is fed to the welding torch 16 through a first cable 24. The first cable 24 may also supply gas to the welding torch 16. As further shown, a second cable 26 couples the welding power supply 12 to a work piece 28 (typically via a clamp) to complete the circuit between the welding power supply 12 and the welding torch 16 during a welding operation.

As mentioned above, the welding application, i.e., the work piece 28, may be located some distance 30 from the welding power supply 12. More particularly, the distance 30 may be sufficiently great where the welding operator is unable to reach the welding power supply 12 and/or it is inconvenient for the welding operator to stop the welding process and move from the work piece 28 to the welding power supply 12 to adjust an operating parameter of the welding power supply 12 using the user interface 20. For example, the work piece 28 in welding environments such as power plants may be in an elevated or difficult to access location. In such circumstances, as the welding operator completes a welding operation, the welding operator may adjust one or more operating parameters of the welding power supply 12 using a wireless sensor module 32. For example, the wireless sensor module 32 may be integrated with a glove 34 or a piece of footwear, such as a boot 36. Alternatively, the wireless sensor module 32 may be a stand-alone unit. For example, in the illustrated embodiment, an appendage unit 38 includes the wireless sensor module 32. The appendage unit 38 may be secured to an appendage, such as an arm or a leg, of the welding operator by a securing band 40. The securing band 40 may be a Velcro strap, a belt, an elastic band, or other strap.

As discussed in detail below, the wireless sensor module 32 includes one or more motion sensors, one or more position sensors, and/or one or more flex sensors configured to detect particular movements of the welding operator. For example, in the glove 34 embodiment, the wireless sensor module 32, which may be disposed on a back surface 44 of the glove 34, is coupled to flex sensors 42 disposed within digit portions 46 of the glove 34. Each flex sensor 42 is configured to detect flexing of a respective digit of the welding operator. Additionally, the wireless sensor modules 32 may include one or more motion or position sensors, such as accelerometers, configured to detect various movements of the welding operator. For example, in the glove 34 embodiment, the sensors of the wireless sensor module 32 may be configured to detect a change in the angle of the welding operator's hand. In such an embodiment, the angle of the welding operator's hand may change when the welding operator tilts his hand forward, backward, left, or right. In the boot 36 embodiment, the wireless sensor module may be disposed on a top surface 47 of the boot 36. The sensors of the wireless sensor module 32 may be configured detect a change in the angle of the welding operator's foot. In such an embodiment, the angle of the welding operator's foot may change when the welding operator taps or lifts his foot. Furthermore, in the appendage unit 38 embodiment, the sensors of the wireless sensor module 32 may be configured to detect the lifting or lateral movements of the welding operator's arm or leg.

Upon the detection of a particular movement of the welding operator, the wireless sensor module 32 wirelessly communicates the adjustment of a particular operating parameter to the welding power supply 12. As mentioned above, particular, defined movements or positions of the welding operator, e.g., the tilting of the welding operator's hand forward, are associated with particular adjustments of different operating parameters of the welding power supply 12. The particular adjustment of an operating parameter is received from the wireless sensor module 32 by a receiver 48 of the welding power supply 12. Upon receiving the operating parameter adjustment information from the wireless sensor module 32, the receiver 48 communicates the adjustment to the welding power supply 12, and the operating parameter is adjusted accordingly. In this manner, the welding operator may adjust any of a number of operating parameters while being remotely located from the welding power supply 12. In other words, the welding operator may adjust different operating parameters of the welding power supply 12 while working on a remote work piece 28 at the distance 30 from the welding power supply 12, without interrupting the welding process. As will be appreciated, in certain embodiments, the welding operator may use more than a single wireless sensor module 32. For example, the welding operator may wear gloves 34 having integrated wireless sensor modules 32 and boots 36 having integrated wireless sensor modules 32.

It should be noted that modifications to the exemplary welding system 10 of FIG. 1 may be made in accordance with aspects of the present invention. For example, the welding wire feeder 14 may further include a user interface to enable a user to input and adjust various wire feed settings or operating parameters of the welding wire feeder 14, such as wire feed speed, welding wire diameter, and so forth. Similarly, one or more wireless sensor modules 32 may be configured to adjust operating parameters of the welding wire feeder 14. Furthermore, although the illustrated embodiments are described in the context of a metal inert gas (MIG) welding process, the features of the invention may be utilized with a variety of welding processes, such as gas tungsten arc welding (GTAW).

Figure 2:
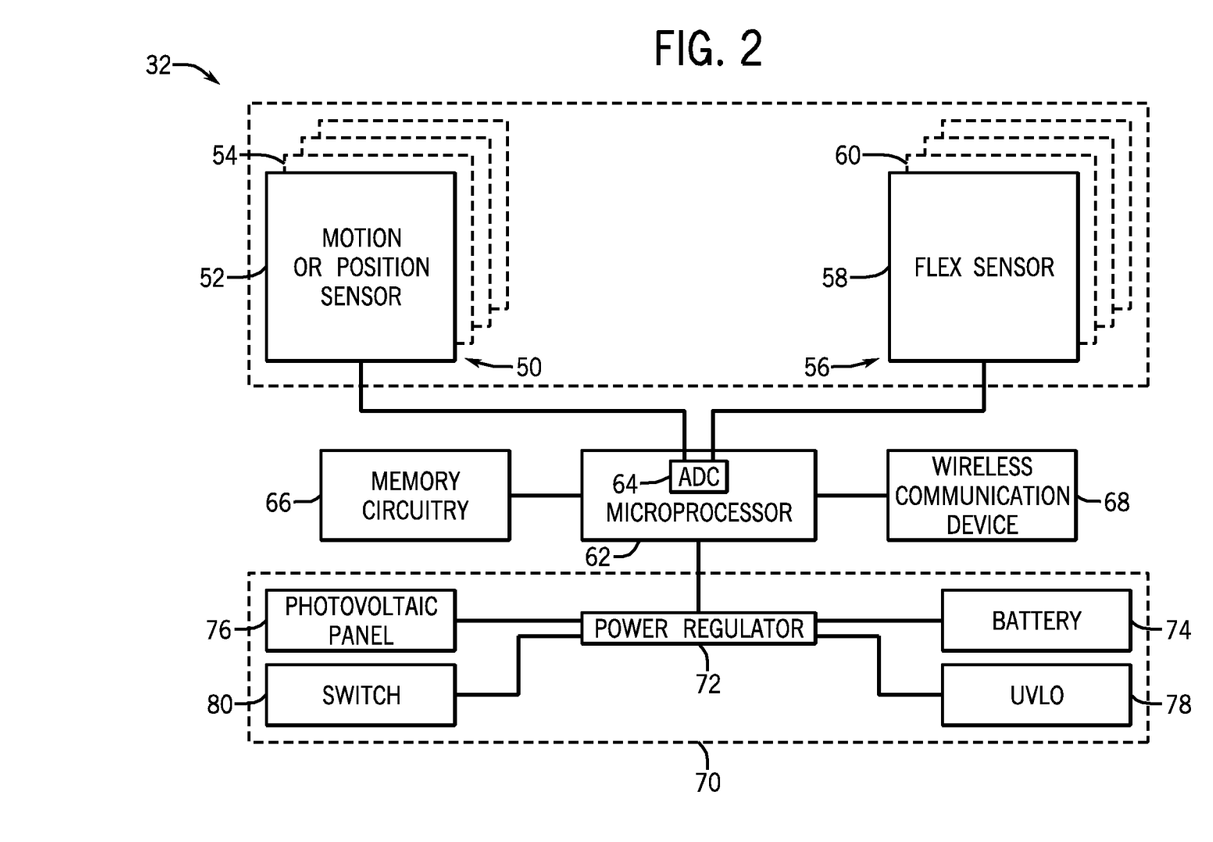
FIG. 2 is a diagrammatical representation of an exemplary wireless sensor module for controlling a welding operating parameter.

FIG. 2 is a schematic of the wireless sensor module 32, illustrating various components of the wireless sensor module 32. As mentioned above, the wireless sensor module 32 includes one or more motion or positions sensors 50 configured to detect particular movements or positions of the welding operator. In one embodiment, the sensors 50 may be accelerometers. As discussed below, each sensor 50 is configured to detect one or more defined motions or positions, e.g., particular movements or positions, of the welding operator. For example, in one embodiment, the wireless sensor module 32 may be integrated with the glove 34 and may have two sensors 50. In such an embodiment, a first sensor 52 may be configured to detect a forward and backward tilt of the welding operator's hand, and a second sensor 54 may be configured to detect a left and right rotation of the welding operator's hand. In other words, each sensor 50 is configured to measure an angle of the welding operator's hand in a forward/backward direction or a left/right direction. Furthermore, the first and second sensors 52 and 54 may be used concurrently to calculate complex movements, angles, or positions of the welding operator's hand.

Additionally, the wireless sensor module 32 includes flex sensors 56. As mentioned above, in a glove 34 embodiment, the flex sensors 56 may be disposed within respective digit portions 46 of the glove 34. For example, a first flex sensor 58 may be disposed in a thumb portion of the glove 34, a second flex sensor 60 may be disposed in an index finger portion of the glove 34, and so forth. The flex sensors 56 are configured to detect a flexing movement or motion of a finger or thumb of the welding operator.

As shown, the sensors 50 and the flex sensors 56 are electrically coupled to a microprocessor 62. More specifically, the sensors 50 and the flex sensors 56 are coupled to an analog-to-digital convertor 64 of the microprocessor 62. As will be appreciated, in the glove 34 embodiment, the sensors 50 and the flex sensors 56 are continuously monitoring the motions and positions of the welding operator's hand. The analog-to-digital convertor 64 converts the continuous data collected by the sensors 50 and the flex sensors 64 to discrete time digital data.

As mentioned above, particular, defined positions and motions of the welding operator are associated with different, particular adjustments of one or more operating parameters of the welding power supply 12. For example, in a glove 34 embodiment, the sensor 50 detecting a forward tilt of the welding operator's hand may be associated with an increase in voltage output of the welding power supply 12. Similarly, a backward tilt of the welding operator's hand may be associated with a decrease in voltage output of the welding power supply. Furthermore, for a given motion or position of the welding operator, an operating parameter of the welding power supply 12 may be adjusted in a variety of ways. For example, when a welding operator tilt's his hand forward, the voltage output of the welding power supply 12 may increase a single, incremental amount, such as 5, 10, 15, or 20 volts. Alternatively, the voltage output of the welding power supply 12 may continually increase on an interval for as long as the position, e.g., the forward tilt of the hand, is maintained. For example, the voltage output may increase 2, 4, 6, 8, or 10 volts every 2 seconds, for as long as the forward tilt position is maintained.

The various associations between particular, defined motions or positions and particular operating parameter adjustments are stored in memory circuitry 66 of the wireless sensor module 32. When a particular motion or position is detected by the sensors 52 and/or the flex sensors 56, the microprocessor 62 retrieves the operating parameter adjustment associated with the particular motion or position from the memory circuitry 66. In certain embodiments, the associations between movements or positions and operating parameter adjustments may be customized for different welding operators. For example, a first user may wish to increase the voltage output of the welding power supply 12 by tilting his right hand forward, and a second welding operator may wish to increase the voltage output of the welding power supply 12 by rotating his left hand to the right. The customized associations between motions or positions and operating parameter adjustments for different welding operators are stored in the memory circuitry 66 of the wireless sensor module 32. Furthermore, the customized associations between motions or positions and operating parameter adjustments may be transferred from the memory circuitry 66 of a first wireless sensor module 32 to the memory circuitry 66 of a second wireless sensor module 32. In this manner, a welding operator can use customized motions for adjusting operating parameters of the welding power supply 12 with more than one glove 34, boot 36, or appendage unit 38.

Once the associated operating parameter adjustment for a particular motion or position is retrieved from the memory circuitry 66 by the microprocessor 62, the operating parameter adjustment is sent to the welding power supply 12 by a wireless communication device 68 of the wireless sensor module 32. As discussed above, the receiver 48 of the welding power supply 12 receives the operating parameter adjustment from the wireless sensor module 32, and the welding power supply 12 adjusts the appropriate operating parameter accordingly. In certain embodiments, the wireless communication device 68 may relay information to the receiver 48 of the welding power supply 12 by radio frequency communication or by infrared communication.

The wireless sensor module 32 also includes a power module 70 that supplies power to the microprocessor 62 of the wireless sensor module 32. The power module 70 has a power regulator 72 configured to provide a constant power level to the microprocessor 62. In other words, the power regulator 72 stabilizes the direct current (DC) voltage provided to the microprocessor 62. One or more power sources may be coupled to the power regulator 72. For example, the power module 70 may include a battery 74, which may be a disposable battery or a rechargeable battery. Additionally, the power module 70 may include a photovoltaic panel 76. As will be appreciated, the photovoltaic panel 76 is configured to generate electrical power from exposure to light. For example, in certain embodiments, the photovoltaic panel 76 may be disposed on an outer surface of the glove 34, the boot 36, or appendage unit 38 having the wireless module sensor 32. In such embodiments, the photovoltaic panel 76 may be exposed to light from a variety of sources including sunlight, ambient light in the welding environment, or arc light generated from the welding process.

The power module 70 also includes an under-voltage lockout (UVLO) 78 coupled to the power regulator 72. The UVLO 78 monitors the power supplied to the microprocessor 62 by the power regulator 72. If the voltage supplied to the microprocessor 62 falls below a specific threshold or operational value, the UVLO 78 will turn off the power supplied by the power module 70, thereby protecting the electrical components, e.g., the microprocessor 62, of the wireless sensor module 32. For example, if the battery 74 has a low charge and is unable to provide the power necessary to operate the microprocessor 62, the UVLO 78 may shut off the power supply to the microprocessor 62. Similarly, if the photovoltaic panel 76 is not exposed to enough light such that the panel 76 is able to generate and provide the power necessary to operate the microprocessor 62, the UVLO 78 may shut off the power supply to the microprocessor 62.

Furthermore, the power module 70 includes a switch 80 coupled to the power regulator 62. The switch 80 is an electromechanical device that allows the welding operator to enable and disable the operation of the wireless sensor module 32, as needed. For example, if the welding operator does not wish to use motion sensing for adjusting the operating parameters of the welding power supply 12, the welding operator may open the switch, thereby turning off the wireless sensor module 32. In this manner, the switch 80 may operate as a "fail-safe" feature to prevent operating parameters of the welding power supply 12 from being unintentionally or inadvertently adjusted by the wireless sensor module 32.

Figures 3, 4:
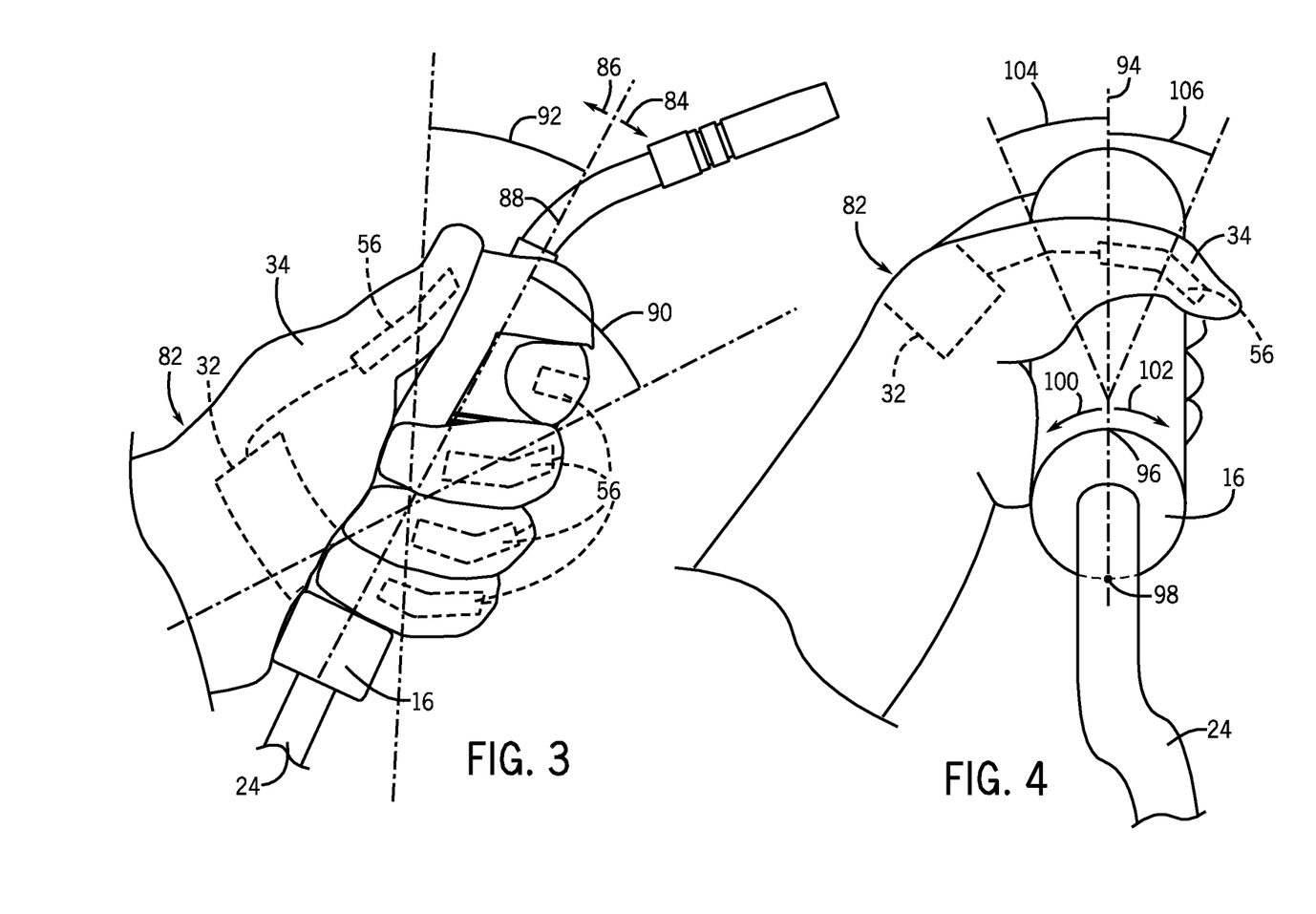
FIG. 3 is a perspective view of a welding glove having a wireless sensor module and holding a welding torch in a welding position, illustrating various positions which may be detected by the wireless sensor module.
FIG. 4 is a perspective view of a welding glove having a wireless sensor module and holding a welding torch, illustrating various positions which may be detected by the wireless sensor module.

FIG. 3 is a perspective view of a welding operator's hand 82 wearing the glove 34 having the wireless sensor module 32. The illustrated embodiment shows exemplary motions that the welding operator's hand 82 wearing the glove 34 may make to adjust an operating parameter of the welding power supply 12 while completing a welding operation with the welding torch 16. The welding torch 16 is held in the welding operator's hand 82 in a welding position. As discussed above, particular motions or positions of the glove 34 are associated with particular adjustments of one or more operating parameters of the welding power supply 12. When a particular motion or position is detected by the sensors 50 and/or the flex sensors 56, the wireless sensor module 32 transmits the corresponding operating parameter adjustment to the welding power supply 12.

The illustrated embodiment shows forward and backward tiling motions of the welding operator's hand 82 and the glove 34. When the welding operator is operating the welding torch 16, the welding operator's hand 82 and the glove 34 may be generally stationary with respect to an axis 88 extending axially through the welding torch 16. That is, during a welding operation, the welding operator's hand 82 and the glove 34 may be at an equilibrium position where the axis 88 extends axially through the welding torch 16. As shown, the welding operator's hand 82 and the glove 34 may tilt forward, in a direction 84, or backward, in a direction 86. As will be appreciated, the forward and backward tilting motions may be defined motions that correspond to respective adjustments of an operating parameter of the welding power supply 12.

Moreover, in order to prevent an unintentional or inadvertent adjustment of an operating parameter, the forward and backward tilting motions may need to be of sufficient magnitude to trigger the operating parameter adjustment. For example, the forward tilting motion in the direction 84 may correspond to an increase in the output voltage of the welding power supply 12. However, in order to trigger an increase in the output voltage, the sensor 50 may need to detect the forward tilt at least at an angle 90 from the axis 88 (i.e., the equilibrium position). In other words, when the sensor 50 detects a forward tilt of the glove 34 at least at the angle 90, the wireless sensor module 32 will instruct the welding power supply 12 to increase the output voltage, in the manner described above. Similarly, the backward tilting motion in the direction 86 may correspond to a decrease in the output voltage of the welding power supply 12, but the sensor 50 of the wireless sensor module 32 may need to detect a backward tilt at least at an angle 92 from the axis 88 (i.e., the equilibrium position). When the sensor 50 detects a backward tilt at least at the angle 92, the wireless sensor module 32 will instruct the welding power supply 12 to decrease the output voltage. In certain embodiments, the angles 90 and 92, which may be customized for different welding operators, may have values of approximately 20, 30, 40, 50, or 60 degrees. Additionally, the angles 90 and 92 may be equal or different.

As discussed above, the adjustments of operating parameters in response to particular motions or positions detected by the wireless sensor module 32 may be effectuated in different manners. For example, when the welding operator's hand 82 and the glove 34 tilt forward at the angle 90, the voltage output of the welding power supply 12 may increase a single, incremental amount, such as 5, 10, 15, or 20 volts. Alternatively, the voltage output of the welding power supply 12 may continually increase for as long as the forward tilt at the angle 90 is maintained. For example, the voltage output may increase 2, 4, 6, 8, or 10 volts every 2 seconds, for as long as the forward tilt position at the angle 90 is maintained.

FIG. 4 is perspective view of the welding operator's hand 82 wearing the welding glove 34 having the wireless sensor module 32, illustrating various angles which may be detected by the wireless sensor module 32. As shown, the welding operator's hand 82 is holding the welding torch 16 in a welding position. When a particular motion or position is detected by the sensors 50 and/or the flex sensors 56, the wireless sensor module 32 transmits the corresponding operating parameter adjustment to the welding power supply 12.

The illustrated embodiment shows leftward and rightward rotating motions of the welding operator's hand 82 and the glove 34. When the welding operator is operating the welding torch 16, the welding operator's hand 82 and the glove 34 may be generally stationary with respect to an axis 94 extending radially through the welding torch 16 from a top 96 to a bottom 98 of the welding torch 16. That is, during a welding operation, the welding operator's hand 82 and the glove 34 may be at an equilibrium position where the axis 94 extends radially through the top 96 and the bottom 98 of the welding torch 16. As shown, the welding operator's hand 82 and the glove 34 may rotate leftward, in a direction 100, or rightward, in a direction 102. As will be appreciated, the leftward and rightward rotating motions may be motions that correspond to respective adjustments of an operating parameter of the welding power supply 12.

In order to prevent an unintentional or inadvertent adjustment of an operating parameter, the leftward and rightward rotating motions may need to be of sufficient magnitude to trigger the operating parameter adjustment. For example, the leftward rotating motion in the direction 100 may correspond to an increase in the current output of the welding power supply 12. However, in order to trigger an increase in the current output, the sensor 50 of the wireless sensor module 32 may need to detect a leftward rotation at least at an angle 104 from the axis 94 (i.e., the equilibrium position). In other words, when the sensor 50 detects a leftward rotation of the glove 34 at least at the angle 104, the wireless sensor module 32 will instruct the welding power supply 12 to increase the current output, in the manner described above. Similarly, the rightward rotating motion in the direction 102 may correspond to a decrease in the current output of the welding power supply 12, but the sensor 50 may need to detect a rightward rotation at an angle 106 from the axis 94 (i.e., the equilibrium position). When the sensor 50 detects a rightward rotation at the angle 106, the wireless sensor module 32 will instruct the welding power supply 12 to decrease the current output. In certain embodiments, the angles 104 and 104, which may be customized for different welding operators, may have values of approximately 20, 30, 40, 50, or 60 degrees. Additionally, the angles 104 and 106 may be equal or different. Furthermore, as discussed above, the adjustments of the current output in response to leftward and rightward rotations detected by the wireless sensor module 32 may be effectuated in different manners. Specifically, the operating parameter adjustment may be a single, incremental adjustment, or the adjustment may be a continual adjustment on an interval for as long as the leftward or rightward rotation is detected.

Figure 5:
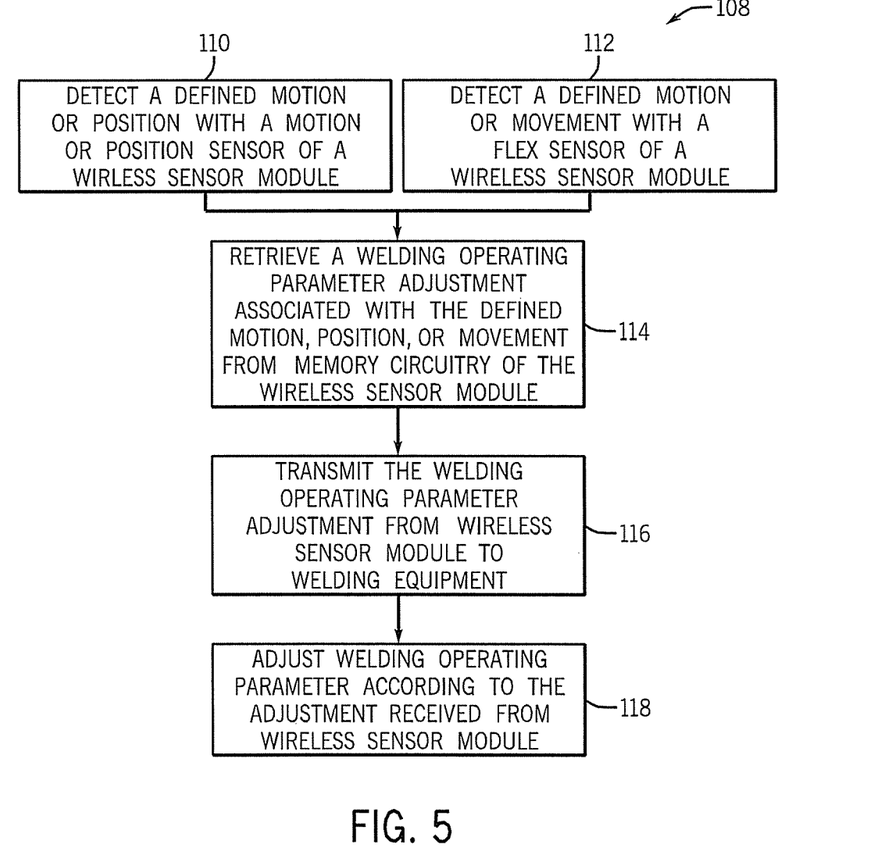
FIG. 5 is a flow chart illustrating an exemplary method of adjusting a welding operating parameter based on a motion detected with a wireless sensor module.

FIG. 5 is a flow chart illustrating an exemplary method 108 of adjusting a welding parameter based on a defined motion detected with a wireless sensor module 32. First, as represented by block 110, a defined motion or position is detected with a motion or position sensor 50 of the wireless sensor module 32. As discussed above, the wireless sensor module 32 and the sensor 50 may be disposed in different articles of clothing that a welding operator may wear, such as a glove 34 or a boot 36. Additionally, the wireless sensor module 32 and the sensor 50 may be disposed in an appendage unit 38 that may be secured to an arm or a leg of the welding operator with a securing band 40. Similarly, as represented by block 112, a defined motion or movement may be detected with a flex sensor 56 of the wireless sensor module 32.

The motion or position sensor 50 and flex sensor 56 may be configured to detect a variety of defined motions. For example, in an embodiment where the wireless sensor module 32 and the sensor 50 are disposed in a glove 34, the motion sensor 50 may be configured to detect forward and backward tilts and leftward and rightward rotations of the welding operator's hand 82. Moreover, for tilts and rotations of the welding operator's hand 82, the defined motions or positions may include a minimum angle of tilt or rotation. The flex sensor 56 may be configured to detect the flexing of a digit of the welding operator's hand 82. As will be appreciated, embodiments of the wireless sensor module 32 may include multiple sensors 50 and flex sensors 56. For example, a glove 34 having the wireless sensor module 32 may have a flex sensor 56 disposed in each digit portion 46 of the glove 34.

Next, as represented by block 114, a welding operating parameter adjustment associated with the defined motion, position, or movement detected by the sensor 50 or flex sensor 56 is retrieved from the memory circuitry 66 of the wireless sensor module 32. As discussed above, each defined motion, position, or movement of a welding operator corresponds with an adjustment of a particular welding operating parameter. For example, adjustments of operating parameters for the welding power supply 12, the welding wire feeder 14, or other welding equipment may be associated with defined motions of a welding operator. Operating parameters that may be adjusted include output voltage of the welding power supply 12, current output of the welding power supply 12, wire feed speed of the welding wire feeder 14, and so forth. When the sensor 50 or the flex sensor 56 detects a defined motion, position, or movement, the event is communicated to the microprocessor 62. The microprocessor 62 then retrieves the operating parameter adjustment that corresponds to the detected motion, position, or movement from the memory circuitry 66.

As represented by block 116, once the operating parameter adjustment is retrieved from the memory circuitry 66, the operating parameter adjustment is transmitted to the welding equipment, e.g., the welding power supply 12 or the welding wire feeder 14. Specifically, the wireless sensor module 32 includes a wireless communication device 68 configured to transmit the operating parameter adjustment to a receiver 48 of the welding power supply 12. The wireless communication device 68 and the receiver 48 may communicate by radio frequency communication, infrared communication, or other type of wireless communication. Once the welding equipment, e.g., the welding power supply 12, receives the operating parameter adjustment information, the welding equipment adjusts the operating parameter accordingly, as represented by block 118.

As discussed above, embodiments of the present disclosure describe a wireless sensor module 32 for controlling an operating parameter of a welding power supply 12 or welding machine. The wireless sensor module 32 is worn by a welding operator and is configured to detect particular, defined motions, positions, or movements of the welding operator using motion or position sensors 50 and flex sensors 56. For example, the wireless sensor module 32 may be integrated with a glove 34, a boot 36, or a separate appendage unit 38 that may be affixed to a welding operator's arm or leg. Upon the detection of a defined motion or position, the wireless sensor module 32 retrieves the operating parameter adjustment associated with the detected motion or position and wirelessly transmits the adjustment to the welding power supply 12 or welding machine. In this manner, a welding operator may adjust a welding operating parameter without being proximate to the welding power supply 12 or welding machine. Additionally, the wireless operation of the wireless sensor module 32 does not require cables or cords, which may create a hazard in a welding environment.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wireless sensor module integrated with an article of clothing, comprising:
 a motion sensor or a position sensor configured to detect a defined motion or a defined position of a welding operator;
 memory circuitry configured to store the defined motion or defined position and an adjustment of an operating parameter of a welding system which corresponds to the defined motion or defined position;
 a processor coupled to the motion sensor or the position sensor and the memory circuitry, wherein the processor is configured to retrieve the adjustment of the operating parameter from the memory circuitry upon detection of the defined motion or defined position by the motion sensor or the position sensor; and
 a wireless communication device coupled to the processor and configured to transmit the adjustment of the operating parameter to the welding system, wherein the motion sensor or position sensor, memory circuitry, processor, and wireless communication device are integrated with a boot or shoe.

2. The wireless sensor module of claim 1, wherein the welding system comprises one or more of a welding power supply, a wire feeder, and a welding torch.

3. The wireless sensor module of claim 1, wherein the welding system comprises a welding power supply having a wireless receiver configured to receive the adjustment of the operating parameter from the wireless communication device.

4. The wireless sensor module of claim 1, comprising a power module configured to supply power to the processor, wherein the power module comprises a photovoltaic panel.

5. The wireless sensor module of claim 4, wherein the power module comprises a physical switch configured to open and close an electrical circuit between the processor and the power module.

6. The wireless sensor module of claim 1, wherein the operating parameter comprises an output voltage, a current output, or a wire feed speed.

7. A method, comprising:
 detecting a defined motion, position, or movement with a motion or position sensor of a wireless sensor module, wherein the wireless sensor module is integrated with a boot or shoe;
 retrieving an operating parameter adjustment associated with the defined motion, position, or movement from memory circuitry of the wireless sensor module;
 transmitting the operating parameter adjustment from the wireless sensor module to a welding system; and
 adjusting an operating parameter of the welding system based on the operating parameter adjustment received from the wireless sensor module.

8. The method of claim 7, wherein transmitting the operating parameter adjustment from the wireless sensor module to a welding system comprises transmitting the operating parameter adjustment from a wireless communication device of the wireless sensor module to a receiver of the welding system.

9. The method of claim 7, wherein the welding system comprises one or more of a welding power supply, a wire feeder, and a welding torch.

10. The method of claim 7, wherein the operating parameter comprises an output voltage, a current output, or a wire feed speed.

11. The method of claim 7, further comprising powering the wireless sensor module with a power module having a photovoltaic panel.

12. The method of claim 7, further comprising customizing one or more of the defined motion, position, or movement, and the operating parameter adjustment associated with the defined motion, position, or movement.

13. The method of claim 7, further comprising storing in the memory circuitry of the wireless sensor module a customized motion, position, or movement, and a customized operating parameter adjustment.

14. The method of claim 13, further comprising:
 detecting the customized motion, position, or movement with the motion or position sensor of a wireless sensor module;
 retrieving the customized operating parameter adjustment associated with the customized motion, position, or movement from the memory circuitry of the wireless sensor module;
 transmitting the customized operating parameter adjustment from the wireless sensor module to the welding system; and
 adjusting a customized operating parameter of the welding system based on the customized operating parameter adjustment received from the wireless sensor module.

15. The method of claim 13, further comprising transferring the customized motion, position, or movement, and the customized operating parameter adjustment, to a second memory circuitry of a second wireless sensor module.

16. A method, comprising:
 storing in a memory circuitry of a wireless sensor module a customized motion, position, or movement, and a customized operating parameter adjustment associated with the customized motion, position, or movement, wherein the wireless sensor module is integrated with a boot or shoe;
 detecting the customized motion, position, or movement with a motion or position sensor of the wireless sensor module;
 retrieving the customized operating parameter adjustment associated with the customized motion, position, or movement from the memory circuitry of the wireless sensor module;
 transmitting the customized operating parameter adjustment from the wireless sensor module to a welding system; and
 adjusting an operating parameter of the welding system based on the customized operating parameter adjustment received from the wireless sensor module.

17. The method of claim 16, further comprising transferring the customized motion, position, or movement, and the customized operating parameter adjustment, to a second memory circuitry of a second wireless sensor module.

18. The method of claim 17, further comprising:
 detecting the customized motion, position, or movement with a second motion or position sensor of the second wireless sensor module; and
 retrieving the customized operating parameter adjustment associated with the customized motion, position, or movement from the second memory circuitry of the second wireless sensor module.

19. The method of claim 18, further comprising:
 transmitting the customized operating parameter adjustment from the second wireless sensor module to a second welding system; and adjusting a second operating parameter of the second welding system based on the customized operating parameter adjustment received from the second wireless sensor module.

20. The method of claim 18, further comprising:
transmitting the customized operating parameter adjustment from the second wireless sensor module to the welding system; and
adjusting the operating parameter of the welding system based on the customized operating parameter adjustment received from the second wireless sensor module.

\* \* \* \* \*